United States Patent [19]

Roe et al.

[11] Patent Number: 5,302,239
[45] Date of Patent: Apr. 12, 1994

[54] METHOD OF MAKING ATOMICALLY SHARP TIPS USEFUL IN SCANNING PROBE MICROSCOPES

[75] Inventors: Fred L. Roe; Kevin Tjaden, both of Boise, Id.

[73] Assignee: Micron Technology, Inc., Boise, Id.

[21] Appl. No.: 884,482

[22] Filed: May 15, 1992

[51] Int. Cl.$^5$ ............................................. G21K 7/00
[52] U.S. Cl. ................................. 156/643; 156/646; 156/659.1; 156/661.1; 156/657; 156/662; 250/306; 250/311
[58] Field of Search ................ 156/657, 659.1, 661.1, 156/662, 643, 646; 250/306, 311

[56] References Cited

U.S. PATENT DOCUMENTS

| | | | |
|---|---|---|---|
| 4,310,380 | 1/1982 | Flamm et al. | 156/657 X |
| 4,639,288 | 1/1987 | Price et al. | 156/657 X |
| 4,741,799 | 5/1988 | Chen et al. | 156/657 X |
| 4,968,382 | 11/1990 | Jacobson et al. | 156/657 X |
| 4,968,585 | 11/1990 | Albrecht et al. | 156/643 X |
| 4,986,877 | 1/1991 | Tachi et al. | 156/657 X |
| 5,051,379 | 9/1991 | Bayer et al. | 156/643 X |
| 5,066,358 | 11/1991 | Quate et al. | 156/657 |
| 5,082,524 | 1/1992 | Cathey | 156/643 |
| 5,094,712 | 3/1992 | Becker et al. | 156/643 |
| 5,201,992 | 4/1993 | Marcus et al. | 156/643 |

OTHER PUBLICATIONS

Marcus et al., "Formation of Silicon Tips with 1 nm Radius", Appl. Physics Letter, vol. 56, No. 3, Jan. 15, 1990.
Hunt et al., "Structure and Electrical Characteristics of Silicon Field-Emission Microelectronic Devices", IEEE Transaction on Electron Devices, vol. 38, No. 10, Oct. 1991.
McGruer et al., "Oxidation-Sharpened Gated Field Emitter Array Process", IEEE Transactions on Electron Devices, vol. 38, No. 10, Oct. 1991.
Farooqui et al., "Microfabrication of Submicron Nozzles in Silicon Nitride", Journal of Microelectromechanical System, vol. 1, No. 2, Jun. 1992, pp. 86-88.

Primary Examiner—Thi Dang
Attorney, Agent, or Firm—Lia M. Pappas

[57] ABSTRACT

An in situ plasma dry etching process for the formation of atomically sharp tips for use in high resolution microscopes in which i) a mask layer is deposited on a substrate, ii) a photoresist layer is patterned superjacent the mask layer at the sites where the tips are to be formed, iii) the mask is selectively removed by plasma etching, iv) after which the substrate is etched in the same plasma reacting chamber, thereby creating sharp microscope tips.

15 Claims, 3 Drawing Sheets

METHOD OF MAKING ATOMICALLY SHARP TIPS USEFUL IN SCANNING PROBE MICROSCOPES

FIELD OF THE INVENTION

This invention relates to high precision mechanical movements, such as used in high resolution microscopes, and more particularly, to a process for the formation of very sharp tips or edges used in scanning probe microscopes.

BACKGROUND OF THE INVENTION

The present invention uses a substrate which, in the preferred embodiment includes a silicon layer. However, a deposited material, such as polysilicon or amorphous silicon, may also be used. Typically, these are semiconductor wafers, although it is possible to use other materials, such as silicon on sapphire (SOS). Therefore, "wafers" is intended to refer to the substrate on which the inventive tips are formed.

High resolution microscopes play an important role in research by providing an image of objects previously imperceptible. The "scanning probe" microscopes are becoming more important in industry as such microscopes have several advantages over the scanning electron microscopes (SEM) presently used. Some of the advantages include: superior resolution, minimal sample damage, and the scanning probe microscopes provide quantitative, three-dimensional topographic data. The scanning tunneling microscope (STM), and atomic force microscope (AFM) are among the currently available high resolution probe scanning microscopes.

These high resolution microscopes function by means of a cantilever system. A very fine, sharp tip is disposed on one end of a soft cantilever spring on the other end of the cantilever is a mechanism for sensing the cantilever's deflection. A feedback loop monitors and controls the deflection. The microtip is used to scan a surface. A mechanical scanning system moves the surface with respect to the tip in a raster pattern. When the very fine tip encounters a microscopic bump in the surface, the sensing mechanism records the distortion, thereby producing an image of the surface as the surface is scanned on a display system that converts the measured data into an image.

Very fine, extremely sensitive tips are required for clarity in the high resolution microscopes. Current tips can have a radius less than 400Å, and are square-pyramidal in shape. The multiple contact points on the tip can result in atomic size images which show a complex superposition of effects.

Some of the present microscopes employ tips made of tungsten, which tips are further coated with a layer of silicon. One drawback with such tungsten tips is the difficulty in depositing the silicon in the desired thinness.

Other tips for scanning tunneling microscopes are disclosed in U.S. Pat. No. 4,985,627 entitled, "Spin-Polarized Scanning Tunneling Microscope," and U.S. Pat. No. 4,968,585 entitled, "Microfabricated Cantilever Stylus with Integrated Conical Tip; Semiconductor Integrated Circuit Fabrication Techniques for Tip for Scanning Tunneling Microscope."

In contrast to the prior art, tips fabricated by the process of the present invention are approximately 7Å–10Å at the apex. The process of the present invention employs dry etching (also referred to as plasma etching) to fabricate sharp tips. Plasma etching is the selective removal of material through the use of etching gases. It is a chemical process which uses plasma energy to drive the reaction. Those factors which control the precision of the etch are the temperature of the etchant, the time of immersion, and the composition of the gaseous etchant.

Various papers refer to reactive ion etching (RIE) and orientation dependent etching (ODE) of silicon to form tips. These technologies rely on either expensive multiple deposition and evaporation steps, or dry etch processes bound by the isotropic etching characteristics of the process gases. For example, prior art dry etch processes limit the manufacturer to a height to width etch ratio of 1:1. To alter this 1:1 ratio in order to obtain an increased depth, a deeper mask would be required.

SUMMARY OF THE INVENTION

The process of the present invention involves an in situ plasma etch of a silicon substrate upon which has been deposited a hard mask layer and a patterned photoresist layer. The mask layer is etched to expose the silicon substrate, which silicon substrate is then etched to form the sharp tips. Alternatively, the patterned layer can have the dual function of hard mask layer and photoresist layer.

The process of the present invention can be used to produce atomically sharp tips with relatively any given aspect ratio and height with a single step (in situ) plasma dry etch process. The elimination of steps in a manufacturing process represents a tremendous advantage both in time and money. Further, the less handling of the wafers that is required, the greater the yields which tend to result.

Although the preferred embodiment is a single step process, the process of the present invention can also be carried out in a series of steps whereby the ratio of reactant gases, the power supplied, or the pressure applied, is varied.

BRIEF DESCRIPTION OF THE DRAWINGS

The present invention will be better understood from reading the following description of nonlimitative embodiments, with reference to the attached drawings, wherein.

DETAILED DESCRIPTION OF THE INVENTION

For the purpose of providing background material and illustrating the state of the scanning probe microscope art, the following articles are hereby incorporated by reference herein:

Rugar, Daniel and Hansma, Paul, "Atomic Force microscopy," PHYSICS TODAY, October 1990. pp. 23-30.

Howland, R.S., "Scanned Probe Microscopy for Semiconductor Inspection," TIME & MEASUREMENT WORLD, January 1991, pp. 53-57.

Smith, Ian and Howland, Rebecca, "Applications of Scanning Probe Microscopy in the Semiconductor Industry, SOLID STATE TECHNOLOGY, December 1990, pp. 53-56.

Figure 1:
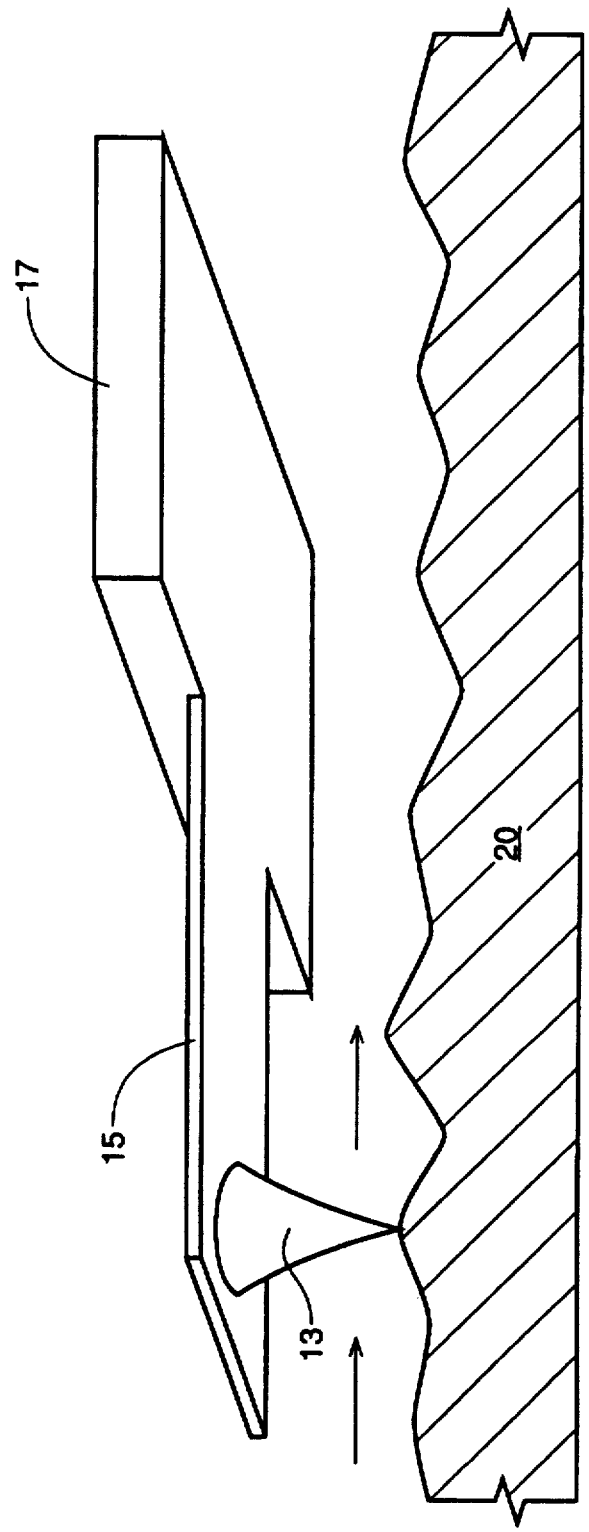
FIG. 1 is a cross-sectional schematic drawing of a high resolution scanning probe microscope tip fabricated by the process of the present invention.

Referring to FIG. 1, probe tip 13 is disposed on cantilever 15, which cantilever is connected to a spring deflection sensor 17. As the sample 20 is mechanically moved in a raster pattern under microtip 13 short range interatomic forces repel the tip 13, and the cantilever 15 is deflected, which deflection is montiored by a feedback system in sensor 17, and then converted through a display system (not shown) which display system provides an image of the sample 20. The sensor 17 can be a position sensitive, photodiode detector. Cantilevers 15 are approximately 100 μm to 200 μm long, and 0.5 μm thick, and made from silicon nitride.

The process of the present invention yields atomically sharp tips 13. For purposes of this application, "atomically sharp" refers to a degree of sharpness that can not be defined clearly by the human eye when looking at a scanning electron microscope (SEM) micrograph of the structure. In other words, in a SEM micrograph of the microtip 13, the human eye can not adequately distinguish where the peak of the tip 13 actually ends because the peak of the tip 13 is of finer dimensions than the clarity or resolution capable with the SEM, and therefore the tip 13 appears somewhat blurred. In reality, the apex of the tip 13 is approximately 7Å-10Å across.

Experimental results have yielded tips 13 having base widths of approximately 1 μm and heights in the range of 2 μm. Further experimentation is anticipated to yield tips 13 having base widths in the relative range of 0.75 μm to 1.25 μm, and relative heights in the approximate range of 0.75 μm to 2.5 μm or more. In the process of the present invention, the balancing of the gases in the plasma etch will enable the manufacturer to determine, and thereby significantly control, the dimensions of the tip 13. Therefore, tips 13 which are taller than 2.5 μm are conceivable using the process of the present invention and the correct etchant gas ratio (e.g. $Cl_2:NF_3$ ratio). The greater the ratio of the gases, the taller the resulting tip 13. It is anticipated that in actual production, the tips will have a height of approximately 1.5 μm to 7.5 μm.

Figure 2:
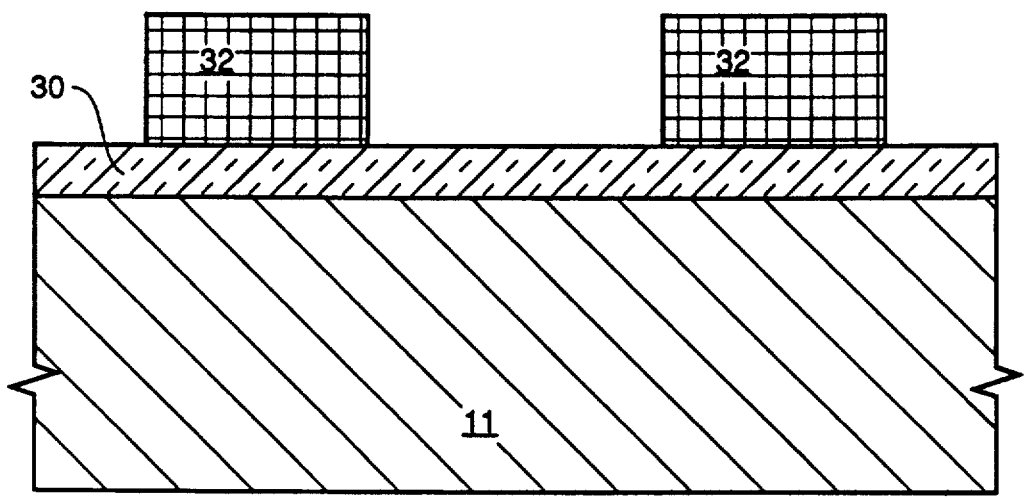
FIG. 2 is a cross-sectional schematic drawing of a substrate on which is deposited a hard mask layer and a patterned photoresist layer.

FIG. 2 depicts the substrate 11, which substrate can be amorphous polysilicon, polysilicon, or any other material from which the tip 13 can be fabricated. The substrate 11 has a mask layer 30 deposited or grown thereon. The hard mask layer 30 can be made of any suitable material which is selective to the substrate 11, the preferred material being an oxide, typically silicon dioxide.

A photoresist layer 32 is patterned on the mask layer 30. Photoresist 32 is commonly used as a mask during plasma etch operations. For etches of silicon, silicon dioxide, silicon nitride, and other metallic and non-metallic compounds, photoresist 32 displays sufficient durability and stability.

Alternatively, a hard mask using only a single photoresist layer 32 can be used. In such a case, an oxide layer would not be needed. The use of a photoresist layer 32 alone is not the preferred method as greater selectivity during the silicon substrate 11 etch is currently available using an oxide layer 30.

Figure 3:
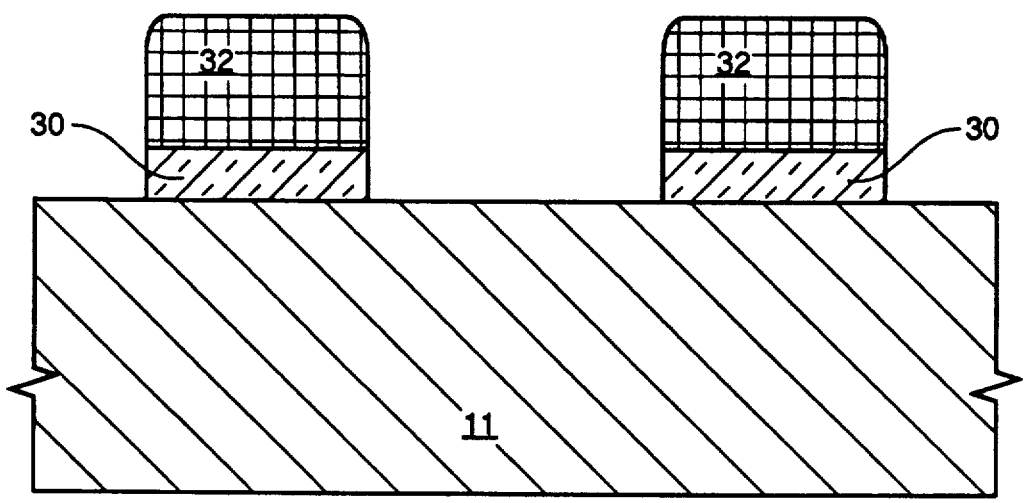
FIG. 3 is a cross-sectional schematic drawing of the structure of FIG. 2, after the mask layer has been selectively removed by plasma dry etch.

The next step in the process is the selective removal of the oxide mask 30 which is not covered by the photoresist pattern 32 (FIG. 3). The selective removal of the hard mask 30 is accomplished preferably through a dry plasma etch, but any oxide etch technique can be used.

In a plasma etch method, the typical etchants used to etch silicon dioxide include, but are not limited to: chlorine and fluorine, and typical gas compounds include: $CF_4$, $CHF_3$, $C_2F_6$, and $C_3F_8$. Fluorine with oxygen can also be used to accomplish the oxide mask 30 etch step. In our experiments $CF_3$, $CHF_3$, and argon were used. The etchant gases are selective with respect to silicon, and the etch rate of oxide is know in the art, so the endpoint of the etch step can be calculated.

In the preferred embodiment, the photoresist layer 32 does not have to be stripped because the photoresist layer 32 is removed in situ during the plasma etch of the substrate 11. Note however, that in changing the balance or ratio of the process etch gases, that the removal rate of the photoresist 32 also changes, and therefore, a removal step of any remaining photoresist 32 may be necessary post-etch. Removal of the photoresist layer 32 can be accomplished by any of the methods known in the art.

Figure 4:
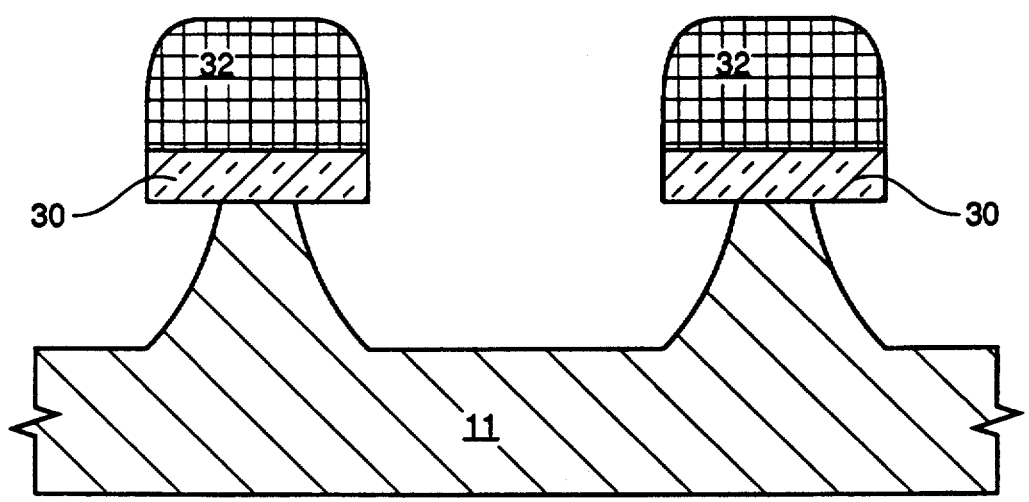
FIG. 4 is a cross-sectional schematic drawing of the structure of FIG. 3, after undergoing a silicon etch.

Immediately after the oxide etch step, preferably in the same chamber and using the same cathode, the silicon layer 11 is etched, this generates a profile as depicted in FIG. 4. Fluorine (preferably $NF_3$, but any fluorine containing process gas can be used) and chlorine (preferably $Cl_2$, but any chlorine containing process gas can be used) are combined in a plasma etching system to create the sharp tips 13 used in field emitting devices. Other silicon etchants include: $CF_4$, $SiF_4$, $CHF_3$, and $SF_6$, and other typical gas compounds include: $BCl_3$, $CCl_4$, $SiCl_4$, and $HCl$.

An alternative embodiment involves removing the substrate 11 from the plasma reactor after the mask layer 30 has been etched, and then placing the substrate 11 in a second plasma reactor to accomplish the silicon substrate 11 etch. In other words, the process of the present invention need not be carried out in situ, although the in situ method would be the most efficient.

The following are the ranges of parameters for the process described in the present application. Included is a range of values which we investigated during the characterization of the process as well as a range of values which provided the best results for tips 13 that were from 1.5 μm to 2 μm high and 0.75 μm to 1 μm at the base. One having ordinary skill in the art will realize that the values can be varied to obtain tips 13 having other height and width dimensions.

| PARAMETER | INVESTIGATED RANGE | PREFERRED RANGE |
|---|---|---|
| $Cl_2$ | 20-70 SCCM | 40-60 SCCM |
| $NF_3$ | 3-15 SCCM | 8-12 SCCM |
| $Cl_2:NF_3$ | 23:1-1.3:1 | 7.5:1-3.3:1 |
| POWER | 100-500 W | 200-300 W |
| PRESSURE | 50-300 mTORR | 160-200 mTORR |
| TEMPERATURE | 20° C. | 20° C. |

In the preferred embodiment of the process, the substrate is kept at a temperature of approximately 20° C. through "backside cooling," which is done by cooling the chuck upon which the wafer rests.

Although we only used a 20° C. wafer temperature, the process of the present invention can be used over a wide range of temperatures. A higher temperatures, the $Cl_2:NF_3$ ratio would have to be increased in order to maintain the tip 13 height, and at still higher temperatures one may have to use a combination of F and Br, Cl and Br, or F and Cl and Br in order to maintain the tip 13 height due to the increase in volatility of the etch products (e.g. $SiF_4$ and $SiCl_4$) at higher temperatures.

In other words, the temperature dependence of the volatilities of the etch products (for example, $SiF_4$ and $SiCl_4$) is important. Changing the temperatures, can change the volatilities, and therefore the height and width ratio.

While the invention is presently in the developmental stage, it is anticipated that the inventive process will include a low pressure atmosphere in order to produce a faster oxide etch rate. Low pressure allows for more ion bombardment because of the longer mean free path that the ions have before colliding with the surface, or other ions. When combined with high radio frequency (RF) power, the etch rate is increased. Low pressure and RF power do have drawbacks, however. Although RF induced ion bombardment assists in oxide etch, it also contributes to photoresist erosion, which is undesirable. Further, if RF power is too high, the resist will "burn" or reticulate.

The use of a low pressure process for etching oxide in the present invention overcomes the negative effects mentioned above by the use of a magnetic field and helium cooled wafers.

Any combination of halide (e.g. fluorine, chlorine, bromine, etc.) containing etch process gases can be used for which the etch products resulting from the plasma assisted reaction of the reactant process gases and the substrate have significantly different volatilities (also referred to as vapor pressure) at the temperature at which the etch takes place. The ratio of the halide containing process gases is used to control the degree of isotropy or anisotropy (perfect anisotropy creating substantially vertical sidewalls), and the height and width at the base of the cathode tip 13.

The degree of isotropy (also referred to as the degree of undercut) is a product of the differing volatilities of the different etch products. For example, in our etch using fluorine (in the form of $NF_3$) and chlorine (in the form of $Cl_2$) the resulting etch products, $SiF_4$ and $SiCl_4$, have different volatilities, and therefore evaporate at different rates, thereby determining the height to width ratio. Different ratios of fluorine to chlorine yield different ratios of height to width.

The primary means of controlling the height to width ratio of the tip 13 formed by the process of the present invention is through the combination of halide containing gases. However, by making use of the temperature dependence of the evaporation rate of the etch products in combination with the increased removal rate of the etch products in a directional way (due to the directional nature of plasma created ions "sputtering" off the etch product). One may control the height to width ratio of the tip 13 by controlling the temperature and/or the impact energy of the ions in the plasma. Ion impact energy is increased by raising the RF power or lowering the process pressure (this increases the mean free path as described above).

The process of the present invention is dependent upon the combination of two different gases having good selectivity with respect to the oxide mask 30. In such a case, the etch will not be bound by the normal height to width etch ratio of 1:1, but the etch can be controlled through the gas flow, i.e. the ratio of fluorine to chlorine. The degree of the undercut (also referred to as isotropy) can be substantially controlled by regulating the amount and partial pressure of the reactant etching gases.

The amount of power to be supplied, and hence, the RF field or magnetic field created by the power supply depends on the flow of the etchant gases selected, which flow is dependent on the size and sharpness of the tips 13 desired.

One having ordinary skill in the art will realize that the other frequencies of energy (e.g. microwaves) other than RF could be adapted for use in the process of the present invention. Further, although the plasma etches of the present invention were carried out in a reactive ion etch (R.I.E.) reactor, a cyclotron could be used, as well.

Figure 5:
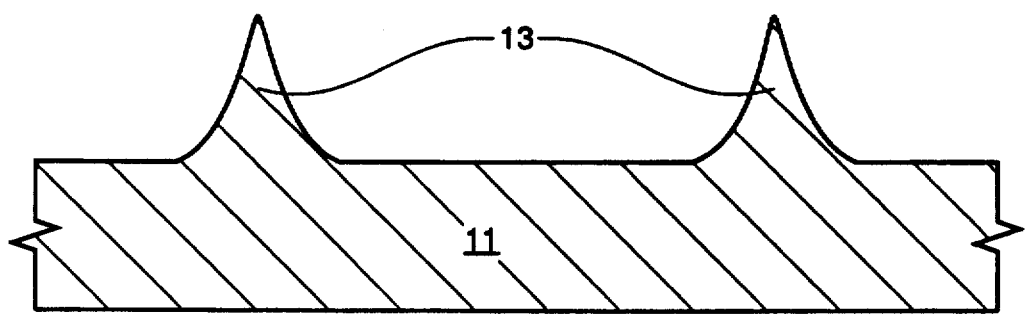
FIG. 5 is a cross-sectional schematic drawing of the structure of FIG. 4, depicting the sharp tip after the silicon etch has been completed, and the mask layer has been removed.

After the tip 13 is fabricated, and the desired dimensions have been achieved, the oxide mask layer 30 can be removed, as depicted in FIG. 5. The mask layer 30 can be stripped by any of the methods well known in the art, for example, a wet etch using a hydrogen fluoride (HF) solution or other HF containing mixture. In the preferred embodiment, the mask layer 30 and the photoresist layer 32 will be substantially consumed by the process of the etch, and the substrate 11 can be dipped in a HF bath. During the silicon substrate 11 etch, the mask layer 30 and photoresist layer 32 may simply fall off the tip 13 as the tip 13 becomes sharper.

After the tips 13 have been fabricated, the wafer substrate 11 can be cut with, for example a diamond-tipped microsaw, and the individual tips 13 separated. Each tip 13 can then be adhered to a cantilever 15 by any of the methods known in the art, as by way of examples, adhesive or a frit seal.

All of the U.S. patents and patent applications cited herein are hereby incorporated by reference herein as if set forth in their entirety.

While the particular process for creating sharp tips for use in flat panel displays as herein shown and disclosed in detail is fully capable of obtaining the objects and advantages herein before stated, it is to be understood that it is merely illustrative of the presently preferred embodiments of the invention and that no limitations are intended to the details of construction or design herein shown other than as described in the appended claims. For example, the process of the present invention was discussed with regard to the fabrication of sharp scanning probe tips for use in high resolution microscopes, however, one with ordinary skill in the art will realize that such a process can be applied to other imaging systems using highly sensitive probes.

We claim:

1. A process for the formation of microtips, said process comprising the following steps:
   exposing a patterned substrate to a plasma, thereby creating microtips having a tip size less than 10Å; and
   segmenting the substrate in order to separate at least some of the plurality of microtips from each other.

2. The process according to claim 1, wherein said plasma comprises a halogenated species.

3. The process according to claim 2, wherein said halogenated species comprises at least one of chlorine and fluorine.

4. The process according to claim 1, wherein said patterned substrate comprises a mask layer and a photoresist layer.

5. The process according to claim 4, wherein said mask layer is an oxide.

6. The process according to claim 5, further comprising the steps of:
 stripping said mask layer after subjecting said substrate to said plasma.

7. The process according to claim 6, wherein said stripping step is a wet etch, said wet etch comprising hydrogen fluoride.

8. A method for controlling aspect ratios useful for forming very sharp asperities comprising the following step:
 isotropically etching a substrate having a mask layer disposed thereon, thereby forming said sharp asperities in a single etch step, said sharp asperities having a tip size of less than 10Å.

9. The process according to claim 8, wherein a plasma is used to etch said substrate, said plasma comprising etchant gases, said aspect ratio being controlled by said etchant gas flow.

10. The process according to claim 9, wherein said mask layer is an oxide.

11. The process according to claim 10, wherein said etchant gases comprises halogenated species.

12. The process according to claim 11, wherein said halogenated species comprising at least one of chloride and fluorine.

13. The process according to claim 12, further comprising the step of:
 removing said mask layer using a wet etch, said wet etch comprising hydrogen fluoride.

14. The process according to claim 13, further comprising the step of:
 cooling said substrate while said substrate is being etched.

15. The process according to claim 14, wherein a photoresist layer is used to pattern said mask layer.

* * * * *